United States Patent
Sun et al.

(10) Patent No.: US 7,674,557 B2
(45) Date of Patent: Mar. 9, 2010

(54) ELECTRODE ACTIVE MATERIALS FOR LITHIUM SECONDARY BATTERIES, METHOD FOR PREPARING THE SAME, AND LITHIUM SECONDARY BATTERIES USING THE SAME

(75) Inventors: Yang-Kook Sun, Seoul (KR); Ho-Hyuk Lee, Seoul (KR)

(73) Assignee: Hanyang Hak Won Co., Ltd., Sungdong-ku, Seoul (KR)

( * ) Notice: Subject to any disclaimer, the term of this patent is extended or adjusted under 35 U.S.C. 154(b) by 1282 days.

(21) Appl. No.: 10/492,757

(22) PCT Filed: Sep. 19, 2002

(86) PCT No.: PCT/KR02/01786

§ 371 (c)(1),
(2), (4) Date: Apr. 14, 2004

(87) PCT Pub. No.: WO03/043109

PCT Pub. Date: May 22, 2003

(65) Prior Publication Data

US 2005/0042514 A1    Feb. 24, 2005

(30) Foreign Application Priority Data

Oct. 16, 2001  (KR)  ...................... 10-2001-0063771

(51) Int. Cl.
*H01M 4/48* (2006.01)

(52) U.S. Cl. ................................ 429/231.95; 429/218.1
(58) Field of Classification Search .............. 429/231.9, 429/102, 231.95, 231.5, 57, 59, 231.8, 218.1, 429/223, 224, 229, 231.1, 231.3, 232

See application file for complete search history.

(56) References Cited

U.S. PATENT DOCUMENTS

| | | | |
|---|---|---|---|
| 3,980,495 A | 9/1976 | Roche et al. | |
| 5,580,683 A | 12/1996 | Takeuchi et al. | |
| 5,620,812 A | 4/1997 | Tahara et al. | |
| 5,707,756 A * | 1/1998 | Inoue et al. | 429/57 |
| 6,228,534 B1 | 5/2001 | Takeuchi et al. | |
| 6,379,844 B1 * | 4/2002 | Redey et al. | 429/231.9 |
| 6,547,893 B1 * | 4/2003 | Itoh et al. | 148/336 |
| 7,205,072 B2 * | 4/2007 | Kang et al. | 429/231.95 |

* cited by examiner

*Primary Examiner*—Patrick Ryan
*Assistant Examiner*—Monique Wills

(57) ABSTRACT

An electrode active material further comprising an amphoteric compound, an alkali metal sulfide or an alkali metal oxide, and lithium secondary batteries using the electrode active material, are disclosed. The lithium secondary batteries neutralize acids generating around electrode active material so that it can inhibit the reduction in battery capacity. In addition, the lithium secondary batteries are excellent in its charge-discharge characteristics, cycle life and thermal stability. A method for preparing the electrode active material for lithium secondary batteries is also provided.

9 Claims, 3 Drawing Sheets

ELECTRODE ACTIVE MATERIALS FOR LITHIUM SECONDARY BATTERIES, METHOD FOR PREPARING THE SAME, AND LITHIUM SECONDARY BATTERIES USING THE SAME

TECHNICAL FIELD

The present invention relates to an electrode active material for lithium secondary batteries, a method for preparing the same and lithium secondary batteries using the same, and more particularly to a positive electrode or a negative electrode active material for lithium secondary batteries which further comprises an amphoteric compound, an alkali metal sulfide or an alkali metal oxide, a method for preparing the electrode active material and lithium secondary batteries using the electrode active material.

BACKGROUND ART

Secondary batteries are used as a power supplier of portable electronic devices for information communications such as PDA, cellular phones, notebook computers, etc., electric bicycles, electric automobiles, and the like. Therefore, there is a growing demand for the secondary batteries capable of repeatedly charging and discharging. In particular, since the performance of the devices depends on secondary batteries, high performance secondary batteries are required. The characteristics required for secondary batteries include charge-discharge characteristics, life characteristics, high-rate characteristics, thermal stability at high temperature and the like. In addition, lithium secondary battery has been drawn attention in terms of high voltage and energy density.

Lithium secondary batteries are classified into lithium batteries using lithium metal as a negative electrode and lithium ion batteries using carbon capable of intercalating/deintercalating lithium ion as an interlayer compound. Further, lithium secondary batteries are often classified into liquid type batteries, gel type polymer and solid type polymer batteries according to the used electrolytes.

Lithium secondary batteries are commonly comprised of a positive electrode, a negative electrode, an electrolyte, a separator, a packaging material, etc. The positive electrode is prepared by dispersing a mixture of a lithium transition metal composite oxide such as $LiCoO_2$, $LiMn_2O_4$, $LiNiO_2$, or $LiMnO_2$ as a positive electrode active material, an electrically conductive agent and a binder into a current collector. The active materials have a high electrochemical potential during intercalation/deintercalation reaction by lithium ion. The active material for a negative electrode includes lithium, carbon, or the like, which has a low electrochemical potential.

The electrolyte is prepared by dissolving a lithium ion-containing salt such as $LiPF_6$, $LiBF_4$, $LiClO_4$, etc., in a polar organic solvent such as ethylene carbonate, propylene carbonate, dimethyl carbonate, diethyl carbonate, methylethyl carbonate, etc. The separator mainly uses polyolefin-based polymer such as porous polyethylene for ion conducting layer and electrical insulation between anode and cathode. The packaging material which protects the contents of battery and provides a path of electrical signal includes a metal can made of iron or aluminum, or a multilayer of aluminum foil and polymer film.

However, lithium secondary batteries have many problems, e.g., the life of battery may be shortened by a repeated charge/discharge cycle, particularly at high temperature. This is because electrolyte is decomposed, active material is deteriorated, or internal resistance of battery increases, due to moisture present in the battery, etc.

Many efforts to solve these problems have been made. For example, Korean Patent Publication No. 10-277796 discloses a method for coating metal oxides such as Mg, Al, Co, K, Na, Ca, etc., onto the surface of positive electrode active material by heat treatment. A technique for increasing energy density and high-rate characteristics by adding $TiO_2$ to $LiCoO_2$ as an active material is disclosed in the "Electrochemical and Solid-State Letters, 4(6), A65-A67 (2001). A technique for improving battery life by surface-treating natural graphite with aluminum is disclosed in the Electrochemical and Solid-State Letters, 4(8), A109-A112 (2001). However, there still exist problems such as life deterioration and the generation of gas due to electrolyte decomposition during charging and discharging cycle.

In addition, a problem that electrolyte is oxidized due to the reduction in battery capacity during charging, and the resulting acid dissolves active material is disclosed in the Journal of Electrochemical Society, 143(1996), p 2204.

DISCLOSURE OF THE INVENTION

The present inventors have earnestly and intensively researched to search causes of deterioration in battery performance during a repeated charge and discharge cycle. As a result, they have found that when material capable of neutralizing acids generating around electrode active material is added, the deterioration in battery performance can be inhibited. In particular, they have found that when amphoteric compound, alkali metal sulfide or alkali metal oxide is added to electrode active material, charge-discharge characteristics, life characteristics and high-rate characteristics of the batteries can be improve, and the generation of gas inside the battery can be inhibited.

Therefore, it is an object of the present invention is to provide an electrode active material for lithium electrode active material for lithium secondary batteries which can improve charge-discharge characteristics, life characteristics and high-rate characteristics of the batteries and inhibit the generation of gas inside the battery.

It is another object of the present invention is to provide a method for preparing the electrode active material for lithium electrode active material for lithium secondary batteries.

It is yet another of the present invention is to provide lithium secondary batteries using the electrode active material for lithium secondary batteries.

In accordance with the present invention, the above and other objects can be accomplished by the provision of an electrode active material for lithium secondary batteries further comprising an amphoteric compound, an alkali metal sulfide or an alkali metal oxide.

The electrode may be a positive electrode or a negative electrode. As a positive electrode active material, any active material in the form of powder having an oxidation/reduction potential of from 1.5V to 6.0V, based on the oxidation/reduction potential of lithium metal may be used in the present invention. Preferably, the active material includes lithium transition metal composite oxides, lithium transition metal composite chalcogen compounds and a mixture thereof containing various elements, but is not limited to these compounds. More preferably, the positive electrode active material includes compounds represented by the following formula (1):

  (1)

wherein, a, b, c and d are independently an equivalent number from 0 to 2,

L, M and N are independently selected from the group consisting of Mn, Co, Ni, Fe, Cu, Cr, Sr, Ti, V, Cu, Zn and Al, e, f and g are independently an equivalent number from 0 to 4, and O, P and Q are independently selected from the group consisting of O, S and F.

As a negative electrode active material, any active material in the form of powder having an oxidation/reduction potential of from 0.001V to 3.5V, based on the oxidation/reduction potential of lithium metal may be used in the present invention. Preferably, the negative electrode active material includes graphite consisting of carbon and compounds represented by the following formulae (2) to (4):

$$A_xB_yM_aN_b \quad (2)$$

wherein x, y, a and b are independently an equivalent number from 0 to 4,

A and B are independently selected from the group consisting of Mn, Co, Ni, Fe, Cu, Cr, Sr, Ti, V, Cu and Zn, and M and N are independently selected from the group consisting of O, S, F, Cl, Br, I, Se, Te and Fr.

$$Si_xM_y \quad (3)$$

wherein x and y are independently an equivalent number from 0 to 2, and

M is one element selected from the group consisting of Mn, Co, Ni, Fe, Cu, Cr, Sr, Ti, V, Cu, Zn, Al and B.

$$SnO_xM_y \quad (4)$$

wherein x and y are independently an equivalent number from 0 to 4, and

M is one element selected from the group consisting of O, S, F, Cl, Br, I, Se, Te and Fr.

The term 'amphoteric compound' referred to herein includes all compounds containing at least one amphoteric element. The amphoteric compound is capable of neutralizing acids generating around the electrode active material. Examples of amphoteric elements include zinc, tin, lead, boron, antimony, arsenium, etc. The compound containing the amphoteric element includes zinc acetate, zinc acetylacetonate, zinc bromide, zinc carbonate, zinc chloride, zinc iodide, zinc nitrate and zinc oxide. Examples of tin-containing compounds include tin acetate(II), tin acetate(IV), tin oxalate(II), tin oxide(II) and tin chloride(II). Examples of lead-containing compounds include lead acetate(II), lead acetate(IV), lead carbonate(II), lead chloride(II), lead nitrate (II) and lead oxide(II). Examples of boron-containing compounds include boron oxide, boron phosphate, boron bromide, boron chloride, and boron trifluoride diethyl etherate $(C_2H_5)_2OBF_3$. Examples of antimony-containing compounds include antimony oxide(III), antimony trichloride (III) and antimony pentachloride(V). Examples of arsenium-containing compounds include arsenium oxide(III), arsenium trichloride(III) and arsenium pentachloride(V). In addition to these compounds, any compound that can react with acids may be used, so long as they do not damage to battery characteristics.

Examples of the alkali metal sulfide include $Li_2S$, $Na_2S$, $K_2S$, $Rb_2S$, $Cs_2S$, etc., and examples of the alkali metal oxide include $Li_2O$, $Na_2O$, $K_2O$, $Rb_2O$, $Cs_2O$, etc.

The present invention also relates to a method for preparing the electrode active material for lithium secondary batteries. The method comprises the steps of: adding a positive electrode or a negative electrode active material to a solution of compound selected from the group consisting of amphoteric compounds, alkali metal oxides and alkali metal sulfides in an appropriate solvent; homogeneously dispersing the mixture; and filtrating and drying the dispersed mixture to remove the solvent. The electrode active material thus prepared has a particle size of from 1 μm to 40 μm, and preferably from 5 μm to 25 μm. If necessary, the solvent-removed powder may be heat-treated at a temperature of from 10° C. to 500° C. for 1~10 hours to coat onto the electrode active material.

Specifically, first, 0.1~20% by weight of the compound selected from the group consisting of amphoteric compounds, alkali metal oxides and alkali metal sulfides is dissolved in a solvent such as alcohol, e.g., methanol, ethanol and isopropanol, or water. Subsequently, the positive electrode active material or negative electrode active material is added to the solution, and the mixture is homogeneously dispersed using an ultrasonic transducer. Finally, the dispersed mixture is filtered and dried in a conventional process to prepare the electrode active material for lithium secondary batteries. Herein, the amount of the compound selected from the group consisting of amphoteric compounds, alkali metal sulfides and alkali metal oxides is within the range of from 0.01% to 5% by weight, and preferably from 0.1% to 2% by weight, based on the weight of the electrode active material. When the amount is smaller than 0.01% by weight, the neutralizing effect on the resulting acids is weak. When the amount exceeds 5% by weight, the energy density of battery is reduced.

The present invention also relates to lithium secondary batteries using the electrode active material for lithium secondary batteries. The lithium secondary batteries can be manufactured by homogeneously applying a mixture of the electrode active material, a binder and an electrically conductive agent onto an aluminum foil or copper foil, and drying to prepare a electrode, and fabricating using an separator, an electrolyte, a packaging material, etc.

The electrolyte usable in the present invention may be a solution of at least one lithium salt selected from the group consisting of $LiCF_3SO_3$, $Li(CF_3SO_2)_2$, $LiPF_6$, $LiBF_4$, $LiClO_4$ and $LiN(SO_2C_2F_5)_2$ in a solvent selected from the group consisting of ethylene carbonate, propylene carbonate, dimethyl carbonate, diethyl carbonate, methylethyl carbonate, vinylidene carbonate, γ-butyrolactone, etc., or a mixed solvent thereof. The separator usable in the present invention may be polyolefin-based polymer such as porous polyethylene. The packaging material usable in the present invention may be a metal can or a multilayered of aluminum foil and polymer film.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENT

Figure 1:
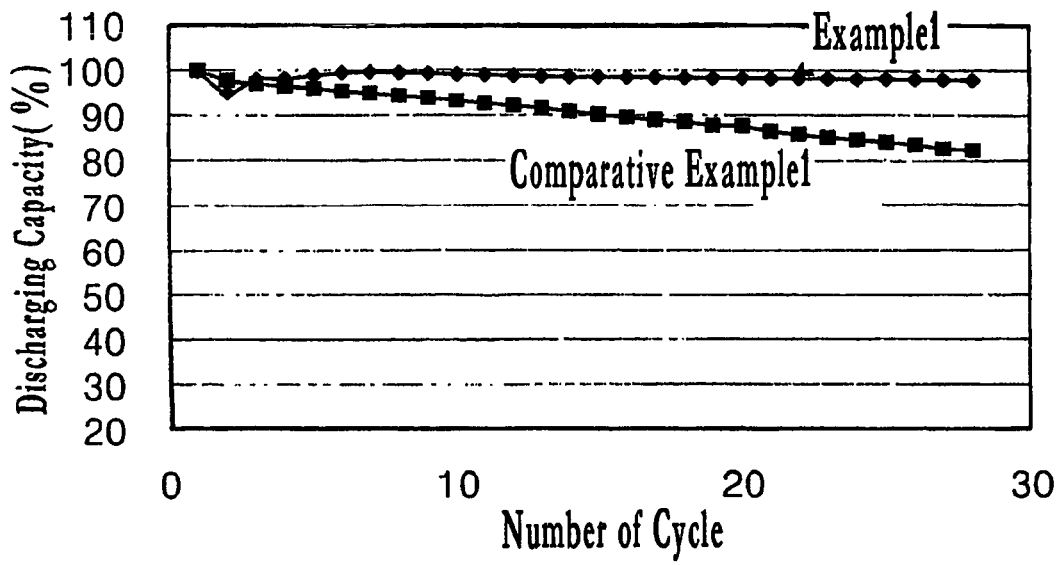
FIG. 1 is a graph comparing the cycle life of the battery manufactured in Example 1 at high temperature with that of the battery manufactured in Comparative Example 1.

Hereafter, the present invention will be more specifically explained with reference to examples shown below. However, the present invention is not limited by these examples.

EXAMPLE

Example 1 i) Preparation of Positive Electrode Active Material 0.1 g of zinc acetate (Aldrich) was dissolved in 5 g of distilled water, and 10 g of $LiMn_2O_4$ powder (Carus Corp., HU-1) was added thereto. After the mixture was mixed homogeneously, the mixture was subjected to sonication for 1 hour. Subsequently, the mixture was dried in a thermostatic oven of 120° C. for 10 hours to prepare a positive electrode active material.

ii) Manufacture of Positive Electrode 0.5 g of carbon black and 0.5 g of polyvinylidene fluoride were added to the positive electrode active material prepared in i), and mixed homogeneously. To the mixture, 5 g of N-methylpyrrolidone (NMP) was added. The resulting mixture was applied onto an aluminum foil having a thickness of 20 μm, dried at a temperature of 100° C. to manufacture a positive electrode.

iii) Manufacture of Coin Battery

The positive electrode manufactured in ii), lithium foil as a counter electrode, porous polyethylene membrane (Celgard LLC, Celgard 2300, thickness: 25 μml) as a separator, and a solution of 1M $LiPF_6$ in a mixed solvent of ethylene carbonate and dimethyl carbonate (1:1 (v/v)) as an electrolyte were used to manufacture a coin battery, in accordance with a conventional manufacturing process. The battery characteristics of the coin battery thus manufactured were tested under a voltage between 4.35V and 3.30V with 1 CmA at a temperature of 55° C. by an electrochemical analysis apparatus (One A Tech, Automatic Battery Cycler, WBCS3000).

Example 2

0.1 g of zinc acetate was dissolved in 5 g of distilled water, and 2.5 g of $LiNi_{0.5}Mn_{1.5}O_4$ powder was added thereto. After the mixture was mixed homogeneously, the mixture was subjected to sonication for 1 hour. Subsequently, the mixture was dried in a in a thermostatic oven of 120° C. for 10 hours to remove water. The dried mixture was heat-treated and coated with ZnO to prepare a positive electrode active material.

A positive electrode and a coin battery were manufactured in the same manner as ii) and iii) of Example 1.

Example 3

0.1 g of zinc acetate was dissolved in 5 g of methanol, and 2.5 g of $LiMnO_2$ powder, which was synthesized at low temperature, was added thereto. After the mixture was mixed homogeneously, the mixture was subjected to sonication for 1 hour. Subsequently, the mixture was dried in a thermostatic oven of 120° C. for 10 hours to prepare a positive electrode active material.

A positive electrode and a coin battery were manufactured in the same manner as ii) and iii) of Example 1.

Example 4

0.1 g of zinc acetate was dissolved in 5 g of distilled water, and 2 g of $Li_{1.1}MnO_2$ powder was added thereto. After the mixture was mixed homogeneously, the mixture was subjected to sonication for 1 hour. Subsequently, the mixture was dried in a thermostatic oven of 120° C. for 10 hours to prepare a positive electrode active material.

A positive electrode and a coin battery were manufactured in the same manner as ii) and iii) of Example 1.

Example 5

A positive electrode and a coin battery were manufactured in the same manner as Example 1, except that tin acetate(II) was used instead of zinc acetate.

Example 6

A positive electrode and a coin battery were manufactured in the same manner as Example 1, except that lead acetate(II) was used instead of zinc acetate.

Example 7

A positive electrode and a coin battery were manufactured in the same manner as Example 1, except that boron phosphate was used instead of zinc acetate.

Example 8

A positive electrode and a coin battery were manufactured in the same manner as Example 1, except that antimony acetate(II) was used instead of zinc acetate.

Example 9 i) Preparation of Negative Electrode Active Material 0.1 g of zinc acetate was dissolved in 5 g of water, and 10 g of graphite powder was added thereto. After the mixture was mixed homogeneously, the mixture was subjected to sonication for 1 hour. Subsequently, the mixture was dried in a thermostatic oven of 200° C. for 10 hours to prepare a negative electrode active material.

ii) Manufacture of Negative Electrode 1 g of polyvinylidene fluoride was added to the negative electrode active material prepared in i), and mixed homogeneously. To the mixture, 10 g of N-methylpyrrolidone (NMP) was added. The resulting mixture was coated onto an copper foil having a thickness of 12 μm, dried at a temperature of 100° C. to manufacture a negative electrode.

iii) Manufacture of Coin Battery

The negative electrode manufactured in ii), lithium foil as a counter electrode, porous polyethylene membrane (Celgard LLC, Celgard 2300, thickness: 25 μm) as a separator, and a solution of 1M LiPF$_6$ in a mixed solvent of ethylene carbonate and dimethyl carbonate (1:1 (v/v)) as an electrolyte were used to manufacture a coin battery, in accordance with a conventional manufacturing process.

The battery characteristics of the coin battery thus manufactured were tested under a voltage between 2.0V and 0.10V with 1 CmA at room temperature by an electrochemical analysis apparatus (One A Tech, Automatic Battery Cycler, WBCS3000).

Example 10

10 g of graphite and 0.1 g of $Sn_2P_2O_7$ powder were dissolved in 10 g of isopropyl alcohol. After the mixture was mixed homogeneously, the mixture was subjected to heat treatment at a temperature of 200° C.

A negative electrode and a coin battery were manufactured in the same manner as ii) and iii) of Example 9.

Example 11

A negative electrode and a coin battery were manufactured in the same manner as ii) and iii) of Example 9, except that tin acetate(II) was used instead of zinc acetate.

Example 12

A negative electrode and a coin battery were manufactured in the same manner as ii) and iii) of Example 9, except that lead acetate was used instead of zinc acetate.

Example 13

A negative electrode and a coin battery were manufactured in the same manner as ii) and iii) of Example 9, except that boron phosphate was used instead of zinc acetate.

Example 14

Manufacture of Lithium Secondary Battery

The positive electrode manufactured in ii) of Example 1, the negative electrode manufactured in ii) of Example 9, porous polyethylene membrane (Celgard LLC, Celgard 2300, thickness: 25 μm) as a separator, and a solution of 1M LiPF$_6$ in a mixed solvent of ethylene carbonate and dimethyl carbonate (1:1 (v/v)) as an electrolyte were used to manufacture a lithium secondary battery, in accordance with a conventional process for manufacturing lithium secondary battery.

Example 15

Graphite powder was treated with zinc acetate solution in Example 9 and heat-treated at a temperature of from 200° C. to 2000° C. Subsequently, a coin battery was manufactured in the same manner as Example 9.

Examples 16~25

Positive electrode active materials, positive electrodes and coin batteries were manufactured in the same manner as Example 1, except that $Li_2S$, $Na_2S$, $K_2S$, $Rb_2S$, $Cs_2S$, $Li_2O$, $Na_2O$, $K_2O$, $Rb_2O$ and Cs=O, respectively, were used instead of zinc acetate.

Examples 26~35

Negative electrode active materials, negative electrodes and coin batteries were manufactured in the same manner as Example 9, except that $Li_2S$, $Na_2S$, $K_2S$, $Rb_2S$, $Cs_2S$, $Li_2O$, $Na_2O$, $K_2O$, $Rb_2O$ and $Cs_2O$, respectively, were used instead of zinc acetate.

Example 36

0.1 g of zinc acetate (Aldrich) was dissolved in 5 g of distilled water, and 10 g of LiMn2O4 powder (Carus Corp., HU-1) was added thereto. After the mixture was mixed homogeneously, the mixture was subjected to ball milling for 20 hour. Subsequently, the mixture was dried in a thermostatic oven of 50° C. for 1 hour. The resultant powder was calcined at 450° C. for 5 hr in air atomosphere.

COMPARATIVE EXAMPLE

Comparative Example 1

A coin battery was manufactured in the same manner as ii) and iii) of Example 1, except that $LiMn_2O_4$ powder was not treated with zinc acetate.

Comparative Example 2

A coin battery was manufactured in the same manner as ii) and iii) of Example 1, except that $LiNi_{0.5}Mn_{1.5}O_4$ powder was used as a positive electrode active material.

Comparative Example 3

A coin battery was manufactured in the same manner as ii) and iii) of Example 1, except that $LiMnO_2$ powder was used as a positive electrode active material.

Comparative Example 4

A coin battery was manufactured in the same manner as ii) and iii) of Example 1, except that $LiMn_{1.1}O_2$ powder was used as a positive electrode active material.

Comparative Example 5

A coin battery was manufactured in the same manner as ii) and iii) of Example 9, except that graphite was used as a negative electrode active material.

Experimental Example 1

Cycle Life of Battery

The cycle life of the batteries of Example 1 and Comparative Example 1 under a voltage between 4.35V and 3.30V with 1 C at a temperature of 55° C. was shown in FIG. 1. As shown in FIG. 1, in case of the battery of Example 1, 98% of the initial capacity was maintained even if the number of cycle was above 25; whereas in case of the battery of Comparative Example 1, only about 82% of the initial capacity was maintained at the number of cycle of above 25.

Figure 2:
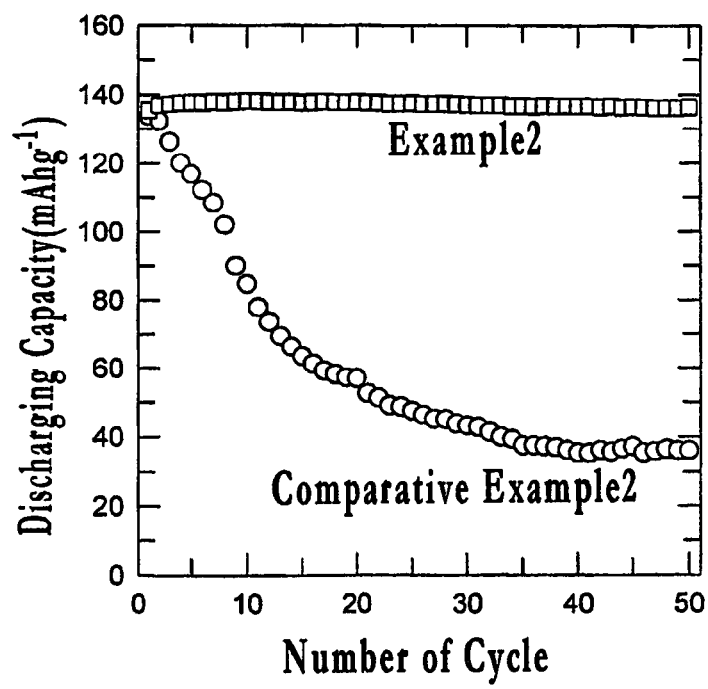
FIG. 2 is a graph comparing the cycle life of the battery manufactured in Example 2 at high temperature with that of the battery manufactured in Comparative Example 2.

The cycle life of the batteries of Example 2 and Comparative Example 2 under a voltage between 5.3V and 3.5V with 0.3 C at a temperature of 55° C. was shown in FIG. 2. As shown in FIG. 2, the initial capacity of the battery of Comparative Example 2 was 133 mAh/g, but was sharply reduced along with the number of cycle to be 27% (36 mAh/g) of the initial capacity after 50 cycles. On the other hand, the initial capacity of the battery of Example 2 was 137 mAh/g, and was maintained to 136 mAh/g even if the number of cycle was above 50. That is, the reduction in battery capacity did not appeared.

This suggests that in case of the electrode not coated with zinc acetate (Comparative Example 2), Mn included in the positive electrode material was dissolved by hydrofluoric acid and, as a result, the initial capacity was sharply reduced. However, in case of the electrode coated with zinc acetate (Example 2), zinc acetate present on the surface of the positive electrode material was reacted with hydrofluoric acid to form $ZnF_2$, thereby inhibiting the elution of Mn.

Figure 3:
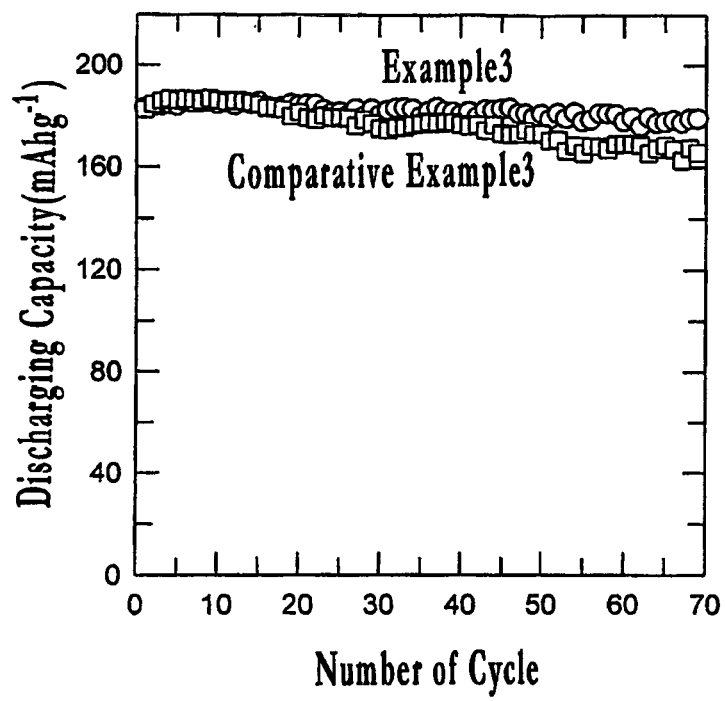
FIG. 3 is a graph comparing the cycle life of the battery manufactured in Example 3 with that of the battery manufactured in Comparative Example 3.

The cycle life of the batteries of Example 3 and Comparative Example 3 when charge-discharged at room temperature was shown in FIG. 3. As shown in FIG. 3, the initial capacity of Comparative Example 3 was 186 mAh/g, but was sharply reduced along with the number of cycle to be 166 mAh/g after 69 cycles. On the other hand, the initial capacity of the battery of Example 3 was 185 mAb/g, and was maintained to 179 mAh/g even if the number of cycle was above 69.

Figure 4:
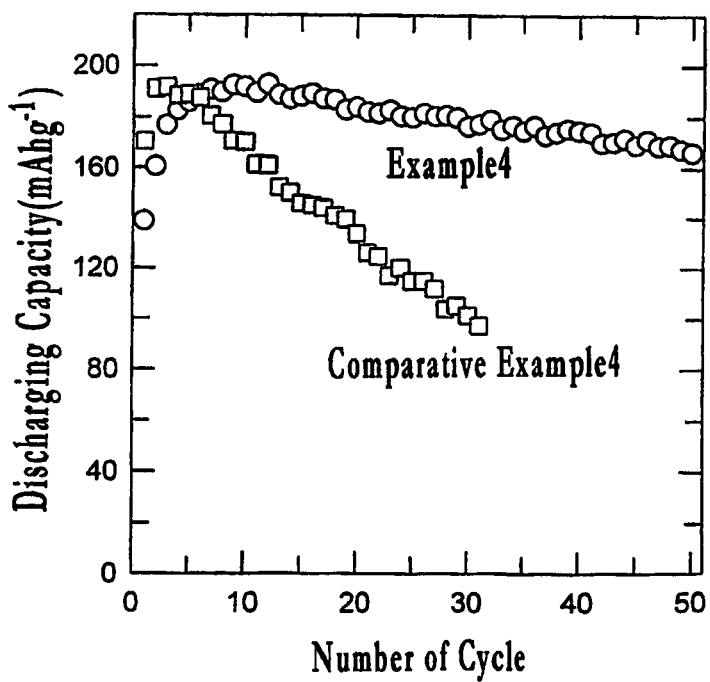
FIG. 4 is a graph comparing the cycle life of the battery manufactured in Example 4 with that of the battery manufactured in Comparative Example 4.

The cycle life of the batteries of Example 4 and Comparative Example 4 when charge-discharged at room temperature was shown in FIG. 4. As shown in FIG. 4, the initial capacity of the battery of Comparative Example 4 was 170 mAh/g, but was sharply reduced along with the number of cycle to be 97 mAh/g after 31 cycles. On the other hand, the initial capacity of the battery of Example 4 was 190 mAh/g, and was maintained to 166 mAh/g even if the number of cycle was above 50.

Figure 5:
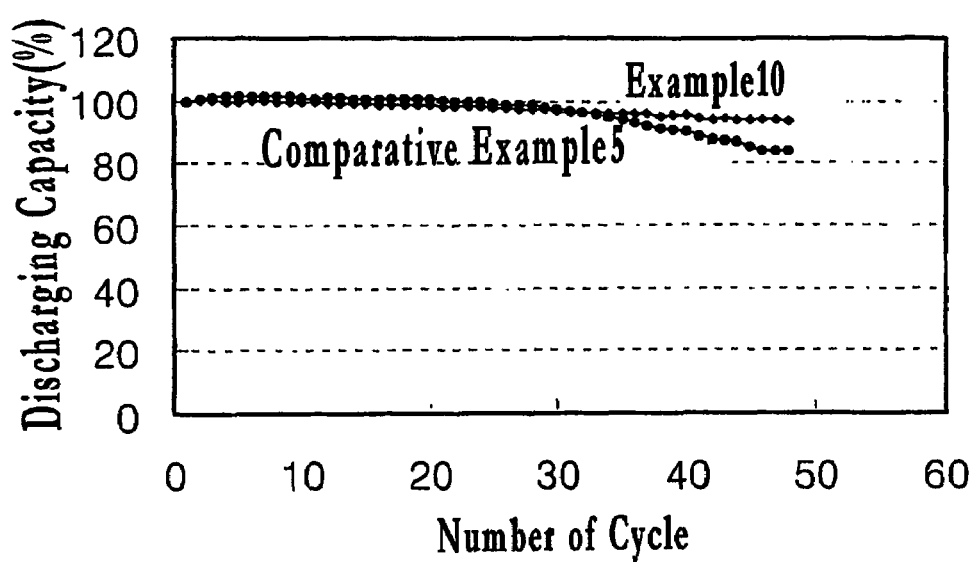
FIG. 5 is a graph comparing the cycle life of the battery manufactured in Example 10 with that of the battery manufactured in Comparative Example 5.

The cycle life of the batteries of Example 10 and Comparative Example 5 when charge-discharged at room temperature was shown in FIG. 5. As shown in FIG. 5, the battery capacity of Example 5 and Comparative Example 10 was maintained to be 92% and 83% of the initial capacity, respectively.

As can be seen from the foregoing, the electrode active material further comprising amphoteric compound, alkali metal sulfide or alkali metal oxide can considerably improve electrode properties.

INDUSTRIAL APPLICABILITY

As described above, lithium secondary batteries using the electrode active material further comprising an amphoteric compound, an alkali metal sulfide or an alkali metal oxide neutralize acids generating around electrode active material so that it can inhibit the reduction in battery capacity. In addition, the lithium secondary batteries using the electrode active material according to the present invention are excellent in its charge-discharge characteristics, cycle life and thermal stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A positive electrode active material for lithium secondary batteries comprising:

a positive electrode active material wherein the positive electrode active material is in the form of powder having an oxidation/reduction potential of from 1.5V to 6.0V, based on the oxidation/reduction potential of lithium metal, and is a compound represented by the following formula (1):

$$Li_aM_bN_cL_dO_eP_fQ_g \qquad (1)$$

wherein, a, b, c and d are independently an equivalent number from 0 to 2,

L, M and N are each a member independently selected from the group consisting of Mn, Co, Ni, Fe, Cu, Cr, Sr, Ti, V, Cu, Zn and Al, e, f and g are independently an equivalent number from 0 to 4, and O, P and Q are each a member independently selected from the group consisting of O, S, F, Cl, Br, I, Se, Te and Fr; and a member coated on the positive electrode active material wherein the member is an amphoteric compound including zinc, tin, lead, antimony, or arsenium.

2. The positive electrode active material according to claim 1, wherein the amphoteric compound is a compound including zinc, tin, lead, antimony or arsenium and selected from the group consisting of zinc acetate, zinc acetylacetonate, zinc bromide, zinc carbonate, zinc chloride, zinc iodide, zinc nitrate, zinc oxide, tin acetate(II), tin acetate(IV), tin oxalate (II), tin oxide(H), tin chloride(II), lead acetate(I), lead acetate (IV), lead carbonate(II), lead chloride(II), lead nitrate(II), lead oxide(II), antimony oxide(III), antimony trichloride(III), antimony pentachloride(V), arsenium oxide(III), arsenium trichloride(III) and arsenium pentachloride(V).

3. The positive electrode active material according to claim 1, wherein the amphoteric compound is included in an amount of from 0.01% to 5% by weight, based on the weight of the electrode active material.

4. The positive electrode active material according to claim 3, wherein the amphoteric compound is included in an amount of from 0.1% to 2% by weight, based on the weight of the positive electrode active material.

5. A lithium secondary battery manufactured by homogeneously applying a mixture of the positive electrode active material according to claim 1, a binder and an electrically conductive agent onto an aluminum foil, drying to prepare a positive electrode, and fabricating using a separator, an electrolyte and a packaging material.

6. The lithium secondary battery according to claim 5, wherein the electrolyte is a solution of at least one lithium salt selected from the group consisting of $LiCF_3SO_3$, $Li(CF_3SO_2)_2$, $LiPF_6$, $LiBF_4$, $LiClO_4$ and $LiN(SO_2C_2F_5)_2$ in a solvent selected from the group consisting of ethylene carbonate, propylene carbonate, dimethyl carbonate, diethyl carbonate, methylethyl carbonate, vinylidene carbonate and γ-butyrolactone, and a combination thereof.

7. The lithium secondary battery according to claim 5, wherein the separator is porous polyolefin-based polymer.

8. The lithium secondary battery according to claim 5, wherein the packaging material is a can made of a member selected from the group consisting of iron, aluminum, and a multilayered composite of aluminum foil and polymer film.

9. The positive electrode active material according to claim 1, wherein the positive electrode active material is $LiMn_2O_4$, $LiMnO_2$, or $LiNi_{0.5}Mn_{1.5}O_4$.

* * * * *